(12) United States Patent
Hashimoto et al.

(10) Patent No.: US 7,301,439 B2
(45) Date of Patent: Nov. 27, 2007

(54) RADIO IC TAG READER WRITER, RADIO IC TAG SYSTEM, AND RADIO IC TAG DATA WRITING METHOD

(75) Inventors: Shigeru Hashimoto, Inagi (JP); Toshiaki Ibi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 272 days.

(21) Appl. No.: 10/986,134

(22) Filed: Nov. 12, 2004

(65) Prior Publication Data
US 2006/0006987 A1    Jan. 12, 2006

(30) Foreign Application Priority Data
Jul. 7, 2004    (JP)    ............... 2004-201130

(51) Int. Cl.
*H04Q 5/22*    (2006.01)
(52) U.S. Cl. ............................ 340/10.51; 340/10.41
(58) Field of Classification Search ............ 340/10.51, 340/10.41
See application file for complete search history.

(56) References Cited

U.S. PATENT DOCUMENTS 6,501,390 B1 * 12/2002 Chainer et al. ............. 340/571
6,720,866 B1    4/2004 Sorrells et al.
2001/0033233 A1 * 10/2001 Jentsch et al. ......... 340/870.17
2003/0227392 A1 * 12/2003 Ebert et al. ............ 340/825.49

FOREIGN PATENT DOCUMENTS

| JP | 11-085925 | 3/1999 |
|---|---|---|
| JP | 2001-187611 | 7/2001 |
| JP | 2002-98774 | 4/2002 |
| JP | 2002-525640 | 8/2002 |
| JP | 2002-267335 | 9/2002 |
| JP | 2003-308374 | 10/2003 |
| JP | 2004-78632 | 3/2004 |
| JP | 2004-133506 | 4/2004 |
| WO | 03/098175 | 11/2003 |

OTHER PUBLICATIONS

Search/Examination Report in corresponding Korean Patent Application No. 030564077 dated May 29, 2006.
Office Action issued in corresponding Taiwanese Application No. 93135108 dated Aug. 7, 2007.

* cited by examiner

*Primary Examiner*—Edwin C. Holloway, III
(74) *Attorney, Agent, or Firm*—Staas & Halsey, LLP

(57) ABSTRACT

An RFID tag reader writer receives temperature data from a temperature sensor and writes the temperature data in a RFID tag. The temperature sensor may be attached to a commodity or arranged near the commodity.

19 Claims, 16 Drawing Sheets

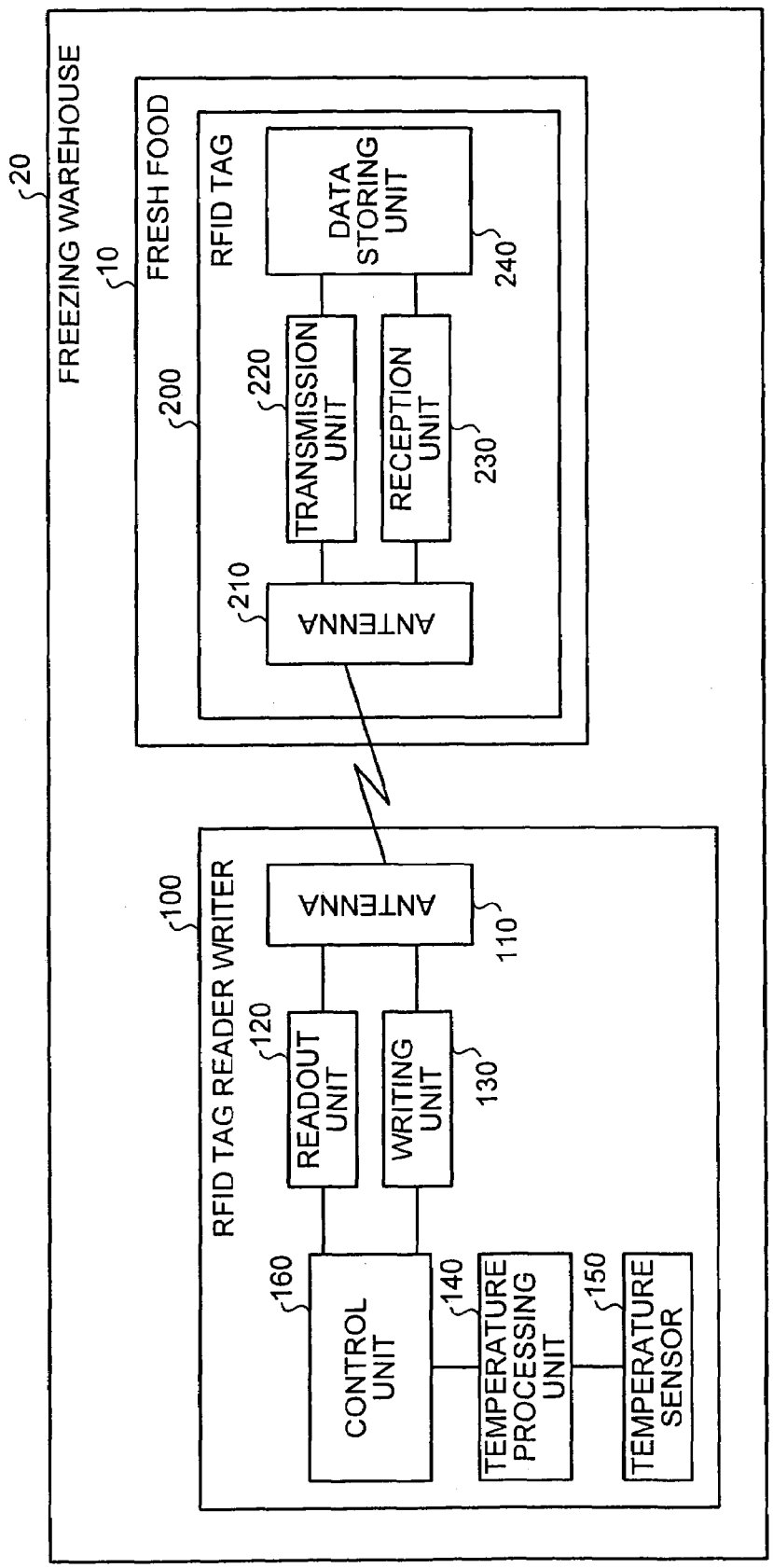

FIG.2

| TAG ADDRESS(UID) ||
|---|---|
| MANUFACTURING TIME INFORMATION ||
| MANUFACTURING PLACE INFORMATION ||
| STORING PLACE INFORMATION ||
| WAREHOUSING TIME INFORMATION ||
| PRESENT NUMBER OF PIECES OF TEMPERATURE INFORMATION ||
| MEASURMENT TIME INFORMATION$_1$ | TEMPERATURE INFORMATION$_1$ |
| MEASURMENT TIME INFORMATION$_2$ | TEMPERATURE INFORMATION$_2$ |
| ⋮ | ⋮ |
| MEASURMENT TIME INFORMATION$_n$ | TEMPERATURE INFORMATION$_n$ |

TEMPERATURE INFORMATION STORING STARTING ADDRESS

FIG.9

| TEMPERATURE THRESHOLD | | OPERATION |
|---|---|---|
| HIGH TEMPERATURE SIDE | >+25°C | INFORM BY ALARM WHEN TEMPERATURE RISES TO +26°C OR MORE |

FIG.10

| TEMPERATURE THRESHOLD | | OPERATION |
|---|---|---|
| LOW TEMPERATURE SIDE | <-5°C | INFORM BY ALARM WHEN TEMPERATURE FALLS TO -6°C OR LESS |
| HIGH TEMPERATURE SIDE | >+25°C | INFORM BY ALARM WHEN TEMPERATURE RISES TO +26°C OR MORE |

☐GROUP ADDRESSES OF GENERAL LEVEL (GROUP B)
bit  15 14 13 12  11 10 9 8  7 6 5 4  3 2 1 0
     X X X X  X X X X  0 0 0 0  0 0 0 0   (H:xx00)
     X X X X  X X X X  0 0 0 0  0 0 0 1   (H:xx01)
     X X X X  X X X X  0 0 0 0  0 0 1 0   (H:xx02)
                TO
     X X X X  X X X X  0 0 0 0  1 1 1 1   (H:xx0F)

☐GROUP ADDRESSES OF HIGH PRIORITY LEVEL (GROUP A)
     X X X X  X X X X  0 0 0 1  0 0 0 0   (H:xx10)
     X X X X  X X X X  0 0 0 1  0 0 0 1   (H:xx11)
     X X X X  X X X X  0 0 0 1  0 0 1 0   (H:xx12)
                TO
     X X X X  X X X X  0 0 0 1  1 1 1 1   (H:xx1F)

FIG.16

| VIBRATION DETECTION LEVEL (MINIMUM VIBRATION DETECTED VALUE) | TAG RECORDING THRESHOLD (MINIMUM VIBRATION AMOUNT TO BE RECORDED IN RFID TAG) | MINIMUM LEVEL UNIT (UNIT FOR DIVIDE VIBRATION AMOUNT INTO LEVELS WITHIN RFID TAG) | MAXIMUM NUMBER OF TIMES OF TAG WRITING (FOR EACH LEVEL) | NUMBER OF VIBRATION SENSORS |
|---|---|---|---|---|
| 0.4G | 0.5G | 0.5G | 255 TIMES | 4 |

FIG.17

| OCCURRENCE TIME | | POSITIONAL INFORMATION | | VIBRATION LEVEL (G) (AVERAGE OF FOUR SENSORS) | USER INFORMATION |
|---|---|---|---|---|---|
| YEAR, DAY | TIME | LATITUDE | LONGITUDE | | |
| 2004.06.20 | 19:09 | xxxx | xxxx | 0.53 | |
| 2004.06.20 | 21:14 | xxxx | xxxx | 0.61 | |
| | | | | | |
| | | | | | |
| | | | | | |

| VIBRATION LEVEL | LEVEL 1 (0.5G TO 0.9G) | LEVEL 2 (1.0G TO 1.4G) | LEVEL 3 (1.5G TO 1.9G) | LEVEL 4 (2G OR MORE) |
|---|---|---|---|---|
| NUMBER OF TIMES OF OCCURRENCE (HEXADECIMAL) | 0F (FIFTEEN TIMES) | 01 (ONCE) | 00 (ZERO TIMES) | 00 (ZERO TIMES) |
| REQUIRED NUMBER OF BYTES | 1 BYTE | 1 BYTE | 1 BYTE | 1 BYTE |
| MAXIMUM NUMBER OF TIMES OF STORAGE | 255 TIMES | 255 TIMES | 255 TIMES | 255 TIMES |

RADIO IC TAG READER WRITER, RADIO IC TAG SYSTEM, AND RADIO IC TAG DATA WRITING METHOD

BACKGROUND OF THE INVENTION

1) Field of the Invention

The present invention relates to radio IC tags.

2) Description of the Related Art

In recent years, establishment of a system using a Radio Frequency Identification (RFID) tag (radio IC tag) has been in progress in various fields (see "RFID technology", retrieved on Jun. 21, 2004, Internet URL:http://itpro.nikkeibp.co.jp/rfid/). The RFID tags are used in various field, such as logistic and apparel, as a replacement of barcodes.

SUMMARY OF THE INVENTION

It is an object of the present invention to provide a RFID tag that is capable of measuring or monitoring conditions around a commodity to which the RFID tag is attached.

A radio IC tag reader writer, which reads out data from a radio IC tag and writes data in the radio IC tag using radio, according to an aspect of the present invention includes a receiving unit that receives from a sensor a value of a parameter measured by the sensor; and a writing unit that writes the value in the radio IC tag.

A radio IC tag system according to another aspect of the present invention is constituted by connecting at least one first radio IC tag reader writer with a plurality of second radio IC tag reader writers via a network. Each of the first radio IC tag reader writer and the second radio IC tag reader writers has a corresponding radio IC tag. The first radio IC tag reader writer includes a receiving unit that receives from a sensor a value of a parameter measured by the sensor; a first writing unit that writes the value in the corresponding radio IC tag; and a transmitting unit that transmits the value received by the receiving unit to the second radio IC tag reader writers via the network. Moreover, each of the second radio IC tag reader writers includes a receiving unit that receives the value transmitted by the transmitting unit; and a second writing unit that writes the value received by the receiving unit in the corresponding radio IC tag.

A radio IC tag system according to still another aspect of the present invention is constituted by connecting at least one first radio IC tag reader writer with a plurality of second radio IC tag reader writers via a network. Each of the first radio IC tag reader writer and the second radio IC tag reader writers has a corresponding radio IC tag. Each of the first radio IC tag reader writer and the second radio IC tag reader writers includes a receiving unit that receives from a corresponding sensor a value of a parameter measured by the corresponding sensor; and a writing unit that writes the value in the radio IC tag. The sensor corresponding to the first radio IC tag reader writer has relatively higher sensitivity than the sensors corresponding to the second radio IC tag reader writers. The first radio IC tag reader writer transmits the value to the second radio IC tag reader writers, and the second radio IC tag reader writers calibrate the value they posses based on the value received from the first radio IC tag reader writer, and write the value after calibration in the corresponding radio IC tag.

A radio IC system according to still another aspect of the present invention includes a plurality of radio IC tag reader writers connected to a computer via a network. Each of the radio IC tag reader writers has a corresponding radio IC tag. Each of the radio IC tag reader writers includes a receiving unit that receives from a sensor a value of a parameter measured by the sensor; a transmitting unit that transmits the value received to the computer via the network; a receiving unit that receives from the computer an average of values received by the computer from other radio IC tag reader writers; and a writing unit that writes the average in the corresponding radio IC tag.

A method of writing data in a radio IC tag according to still another aspect of the present invention includes receiving a value of a parameter measured by a sensor; and writing the value in the radio IC tag.

A temperature monitoring system according to still another aspect of the present invention monitors temperature of a commodity. The temperature monitoring system includes a radio IC tag reader writer, a radio IC tag attached to the commodity, and a temperature sensor that measures a temperature of the commodity or around the commodity. The radio IC tag reader writer includes a receiving unit that receives from the temperature sensor a value that represents the temperature of the commodity; and a writing unit that writes the value in the radio IC tag.

A vibration monitoring system according to still another aspect of the present invention monitors vibrations of a commodity while the commodity is being transported. The vibration monitoring system includes a radio IC tag reader writer, a radio IC tag attached to the commodity, and a vibration sensor that measures vibrations of the commodity or around the commodity. The radio IC tag reader writer includes a receiving unit that receives from a vibration sensor a value that represents vibrations measured by the vibration sensor; a judging unit that judges whether the value received by the receiving unit exceeds a predetermined threshold; and a writing unit that writes the value in the radio IC tag if the judging unit judges that the value exceeds the predetermined threshold.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a functional block diagram of a structure of a temperature monitoring system according to a first embodiment of the present invention;

FIG. 2 is a diagram of an example of a data structure of a data storing unit;

FIG. 9 is a diagram of an example of a temperature threshold stored by an RFID tag;

FIG. 10 is a diagram of an example in which an RFID tag stores two temperature thresholds;

FIG. 16 is a diagram of an example of threshold information stored by a threshold information storing unit;

FIG. 17 is a diagram of an example of history information stored by a history information storing unit;

DETAILED DESCRIPTION

Figure 3:
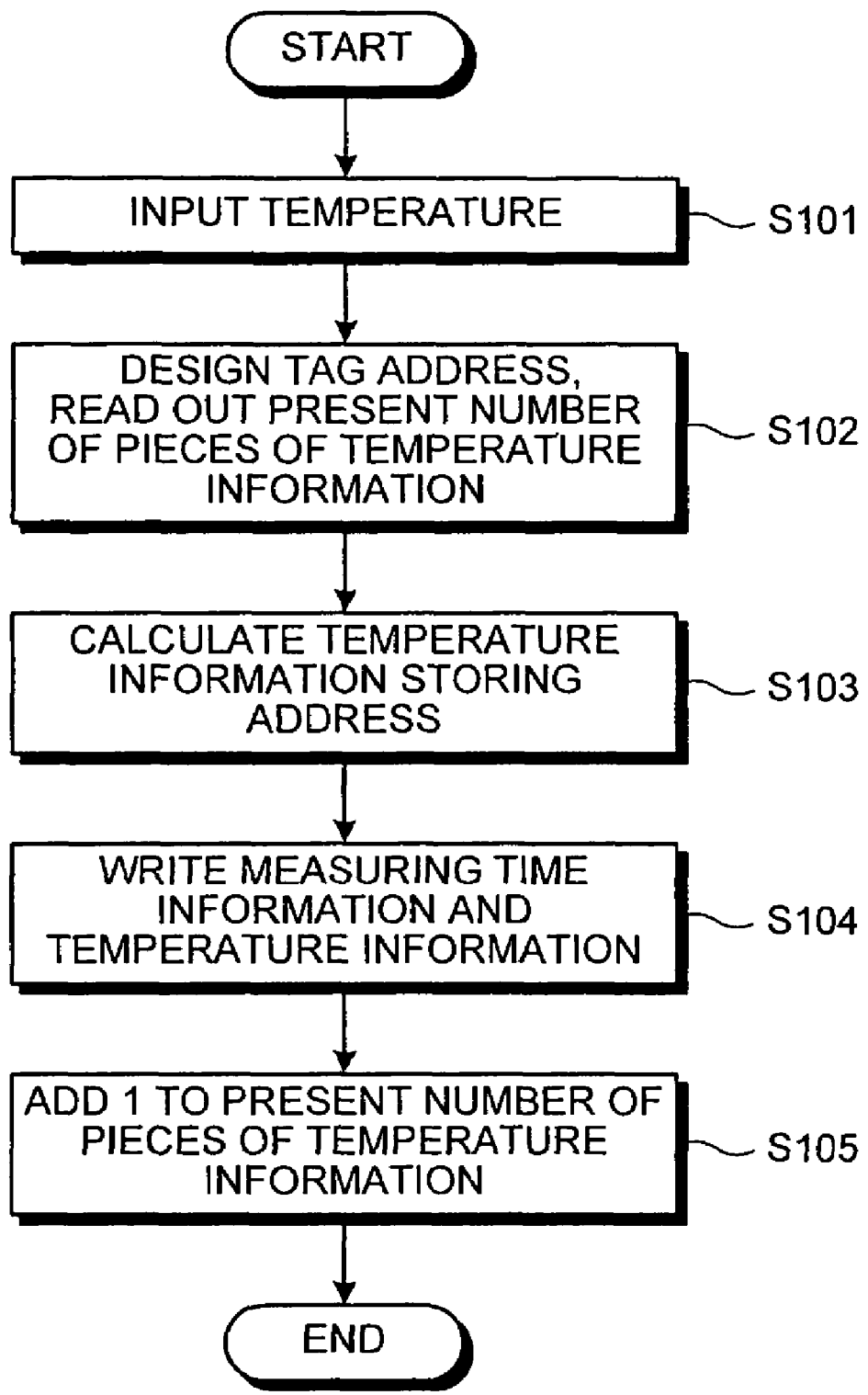
FIG. 3 is a flowchart of a temperature writing processing by an RFID tag reader writer according to the first embodiment.

Exemplary embodiments of a radio IC tag reader writer, a radio IC tag system, and a radio IC tag data writing method according to the present invention will be hereinafter explained in detail with reference to the attached drawings.

FIG. 1 is a functional block diagram of a structure of a temperature monitoring system according to a first embodiment of the present invention. The temperature monitoring system includes an RFID tag reader writer 100, a freezing warehouse 20 in which fresh food 10, like tuna fish, is stored, and an RFID tag 200 that is attached to the fresh food 10 and that monitors temperature of the fresh food 10. Although only one piece of fresh food 10 and one RFID tag 200 are shown in FIG. 1, there may be many different items of fresh foods each attached with an RFID tag.

The RFID tag reader writer 100 is an apparatus that reads out data from the RFID tag 200 and writes data in the RFID tag 200 using radio. The RFID tag reader writer 100 includes an antenna 110, a readout unit 120, a writing unit 130, a temperature processing unit 140, a temperature sensor 150, and a control unit 160.

The antenna 110 is a processing unit that transmits and receives data to and from the RFID tag 200 by radio based on a data readout request from the readout unit 120 and a data writing request from the writing unit 130.

The readout unit 120 is a processing unit that transmits a data readout request to the RFID tag 200 and receives requested data from the RFID tag 200. More specifically, the readout unit 120 requests readout of data designating a tag address for identifying the RFID tag 200, a storage address for data, and a data length.

The writing unit 130 is a processing unit that transmits a data writing request to the RFID tag 200 together with data to be written. More specifically, the writing unit 130 requests writing of data designating a tag address, a storage address of data, and data length.

The temperature processing unit 140 is a processing unit that periodically measures temperature in the freezing warehouse 20 using the temperature sensor 150 and instructs the writing unit 130 to write the measured temperature in the RFID tag 200 together with measurement time.

This temperature processing unit 140 periodically measures temperature in the freezing warehouse 20 using the temperature sensor 150 and instructs the writing unit 130 to write the measured temperature in the RFID tag 200. This makes it possible to record and manage at what temperature the fresh food 10 is stored.

The temperature sensor 150 is a sensor incorporated in the RFID tag reader writer 100 and measures temperature in the freezing warehouse, in which the RFID tag reader writer 100 is set, based on an instruction from the temperature processing unit 140.

The control unit 160 is a processing unit that controls the entire RFID tag reader writer 100. More specifically, the control unit 160 performs exchange and the like of data among the respective functional units to thereby cause the RFID tag reader writer 100 to function as one apparatus.

The RFID tag 200 is a radio IC tag, which stores information on the fresh food 10 to which the RFID tag 200 is attached, and includes an antenna 210, a transmitting unit 220, a receiving unit 230, and a data storing unit 240.

The antenna 210 is a processing unit that transmits and receives data to and from the RFID tag reader writer 100 by radio. The antenna 210 receives transmitted data from the transmitting unit 220 and delivers received data to the receiving unit 230.

The transmitting unit 220 is a processing unit that transmits data stored in the data storing unit 240 to the RFID tag reader writer 100 via the antenna 210 in response to a data readout request from the RFID tag reader writer 100.

The receiving unit 230 is a processing unit that writes data, which is received from the RFID tag reader writer 100 via the antenna 210, in the data storing unit 240 in response to a data writing request from the RFID tag reader writer 100.

The data storing unit 240 is for storing information concerning the fresh food 10. FIG. 2 is a diagram of an example of a data structure of the data storing unit 240. As shown in the figure, in this data storing unit 240, a tag address (UID) for identifying the RFID tag 200, manufacturing time information indicating manufacturing time of the fresh food 10, manufacturing place information indicating a manufacturing place of the fresh food 10, storing place information indicating a storing place of the fresh food 10, warehousing information indicating warehousing time when the fresh food 10 is warehoused in a freezing warehouse, a present number of pieces of temperature information i indicating the number of pieces of temperature information stored at present, and i pieces of temperature information are stored together with measurement time information. Note that this data storing unit 240 can store n ($\geq$i) pieces of temperature information together with the measurement time information.

Next, a processing procedure of temperature writing processing by the RFID tag reader writer 100 according to the first embodiment will be explained. FIG. 3 is a flowchart of the processing procedure of the temperature writing processing by the RFID tag reader writer 100 according to the first embodiment.

Note that, here, it is assumed that the RFID tag reader writer 100 knows a tag address of the RFID tag 200 and addresses, where the respective pieces of information in the data storing unit 240 shown in FIG. 2 are stored, in advance.

As shown in FIG. 3, in this RFID tag reader writer 100, the temperature processing unit 140 inputs temperature from the temperature sensor 150 at a fixed time interval (step S101). Then, designating a tag address, the temperature processing unit 140 reads out the present number of pieces of temperature information from the RFID tag 200 using the readout unit 120 (step S102) and calculates the next temperature information storing address from a temperature information storing starting address and the present number of pieces of temperature information (step S103).

Then, the temperature processing unit 140 writes the inputted temperature in the next temperature information storing address of the RFID tag 200 together with measurement time using the writing unit 130 (step S104) and adds "1" to the present number of pieces of temperature information and writes the present number of pieces of temperature information in the RFID tag 200 (step S105).

In this way, the temperature processing unit 140 inputs temperature from the temperature sensor 150 at the fixed time interval and writes the inputted temperature in the RFID tag 200 together with the measurement time. This makes it possible to manage a temperature history of the fresh food 10 in the freezing warehouse 20.

As described above, in the first embodiment, the temperature processing unit 140 of the RFID tag reader writer 100 measures temperature at the fixed time interval using the temperature sensor 150 and writes measured temperature in the RFID tag 200. This makes it possible to manage storing temperature of the fresh food 10 in the freezing warehouse 200 using the RFID tag 200.

Incidentally, in the first embodiment, the case in which the RFID tag reader writer 100 has the temperature sensor 150 incorporated therein is explained. However, it is also possible to use a temperature sensor by connecting the temperature sensor to an RFID tag reader writer that does not have a temperature sensor incorporated therein. Thus, in a second embodiment of the present invention, a temperature monitoring system, which connects a temperature sensor to an RFID tag reader writer to perform temperature monitoring of fresh food stored in a freezing warehouse, will be explained.

Figure 4:
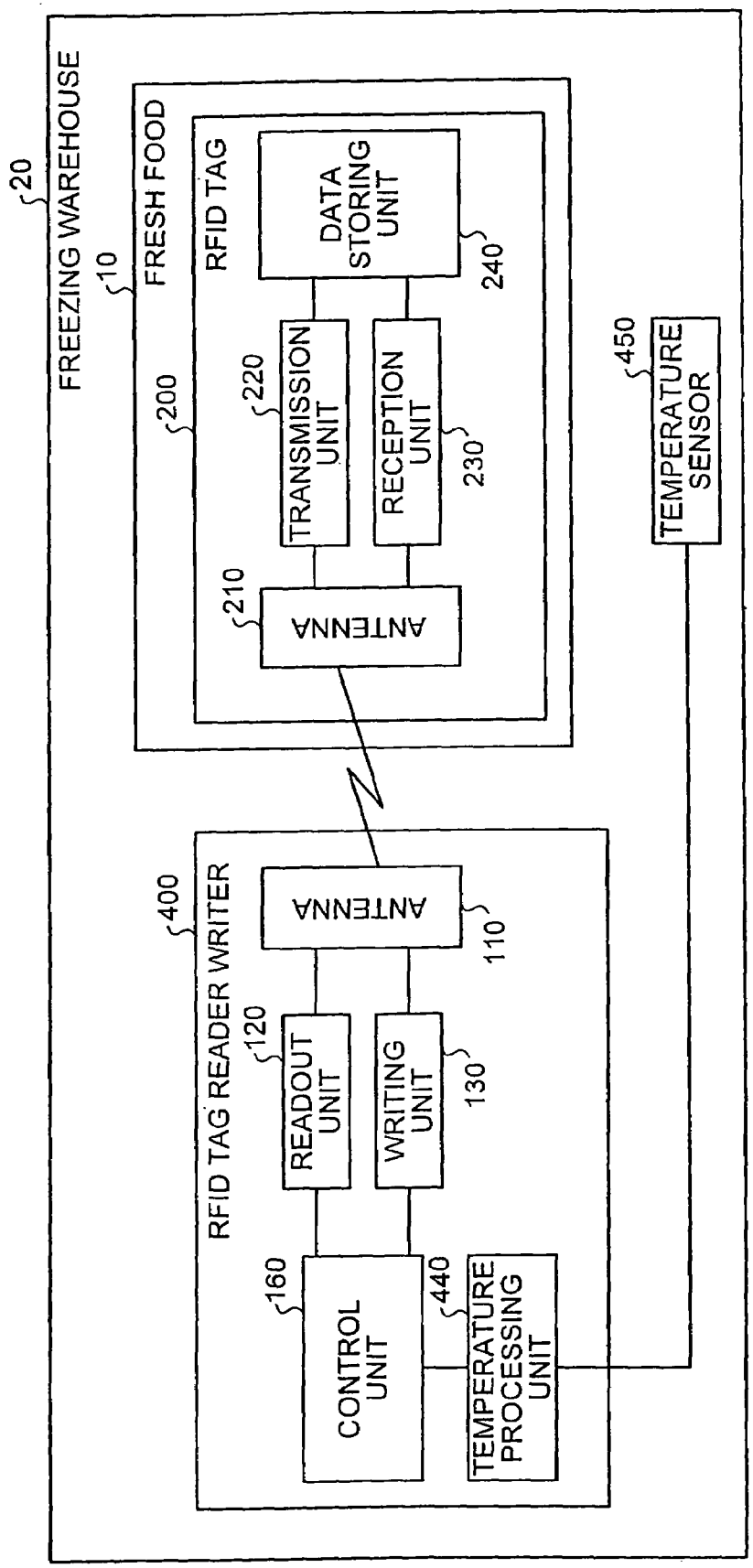
FIG. 4 is a functional block diagram of a system structure of a temperature monitoring system according to a second embodiment of the present invention.

FIG. 4 is a functional block diagram of a system structure of the temperature monitoring system according to the second embodiment. Note that, here, for convenience of explanation, functional units carrying out the same roles as the respective units shown in FIG. 1 will be denoted by the identical reference numerals, and a detailed explanation of the functional units will be omitted.

As shown in FIG. 4, in this temperature monitoring system, an RFID tag reader writer 400 is used instead of the RFID tag reader writer 100, and the RFID tag reader writer 400 measures temperature using a temperature sensor 450, which is set near fresh food, instead of having the temperature sensor 150 incorporated therein.

A temperature processing unit 440 measures temperature near the fresh food 10 at a fixed time interval using the temperature sensor 450 and writes a measured value in the RFID tag 200 together with measurement time using the writing unit 130.

As described above, in the second embodiment, the temperature sensor 450 is arranged near the fresh food 10, and the temperature processing unit 440 measures temperature in the freezing warehouse 20 using the temperature sensor 450. This makes it possible to measure temperature of the fresh food 10 accurately.

In the first and the second embodiments, the case in which the RFID tag reader writer measures temperature in the freezing warehouse independently using the temperature sensor and writes the measured temperature in the RFID tag 200 is explained. However, the RFID tag reader writer can also transfer measured temperature to a host computer and write the temperature in the RFID tag 200 according to an instruction from the host computer. Thus, in a third embodiment of the present invention, a temperature monitoring system, which transfers measured temperature to a host computer and writes the temperature in the RFID tag 200 according to an instruction from the host computer, will be explained.

Figure 5:
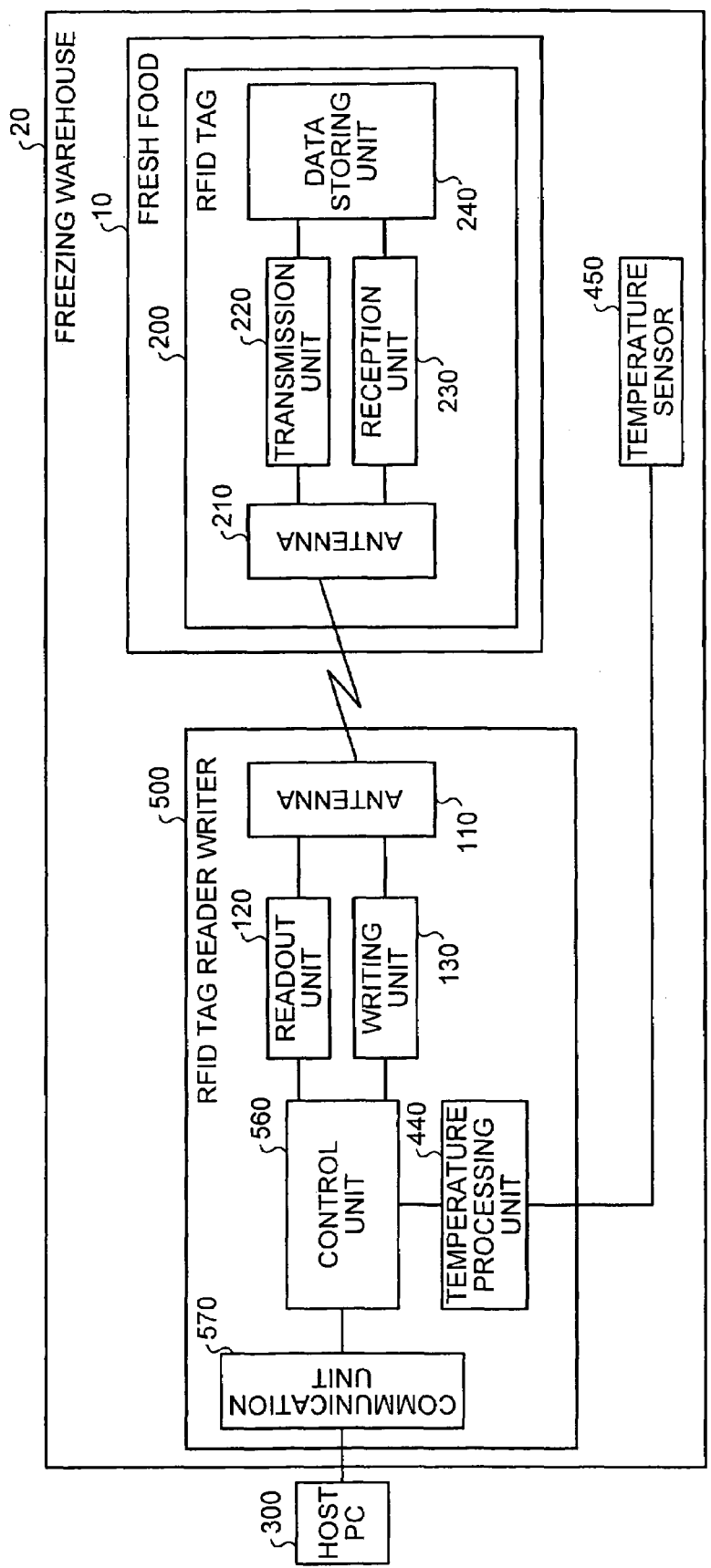
FIG. 5 is a functional block diagram of a system structure of a temperature monitoring system according to a third embodiment of the present invention.

FIG. 5 is a functional block diagram of a system structure of the temperature monitoring system according to the third embodiment. Note that, here, for convenience of explanation, functional units carrying out the same roles as the respective units shown in FIG. 4 will be denoted by the identical reference numerals, and a detailed explanation of the functional units will be omitted. As shown in FIG. 5, this temperature monitoring system includes an RFID tag reader writer 500, an RFID tag 200, and a host PC 300.

The host PC 300 is a computer that receives temperature measured by the RFID tag reader writer 500 and instructs the RFID tag reader writer 500 to write the temperature in the RFID tag 200. The host PC 300 is connected to the RFID tag reader writer by a network.

The RFID tag reader writer 500 includes a communication unit 570 in addition to the antenna 110, the readout unit 120, the writing unit 130, the temperature processing unit 440, and a control unit 560 that controls the entire RFID tag reader writer 500. The communication unit 570 communicates with the host PC 300 via the network. The communication unit 570 receives data to be written in the RFID tag 200 from the host PC 300 and transmits temperature or the like measured by the temperature processing unit 440 to the host PC 300.

As described above, in the third embodiment, the RFID tag reader writer 500 transmits measured temperature to the host PC 300, and the host PC 300 instructs the RFID tag reader writer 500 to write the temperature in the RFID tag 200. Thus, the host PC 300 can also write necessary data in the RFID tag 200 in addition to the temperature.

In the first to the third embodiments, the case in which temperature measured by an RFID tag reader writer is recorded in the RFID tag 200 is explained. However, it is also possible to manage the temperature measured by the RFID tag reader writer in a host PC. Thus, in a fourth embodiment of the present invention, a temperature monitoring system, which transfers temperature measured by an RFID tag reader writer to a host PC and manages the temperature in the host PC, will be explained.

Figure 6:
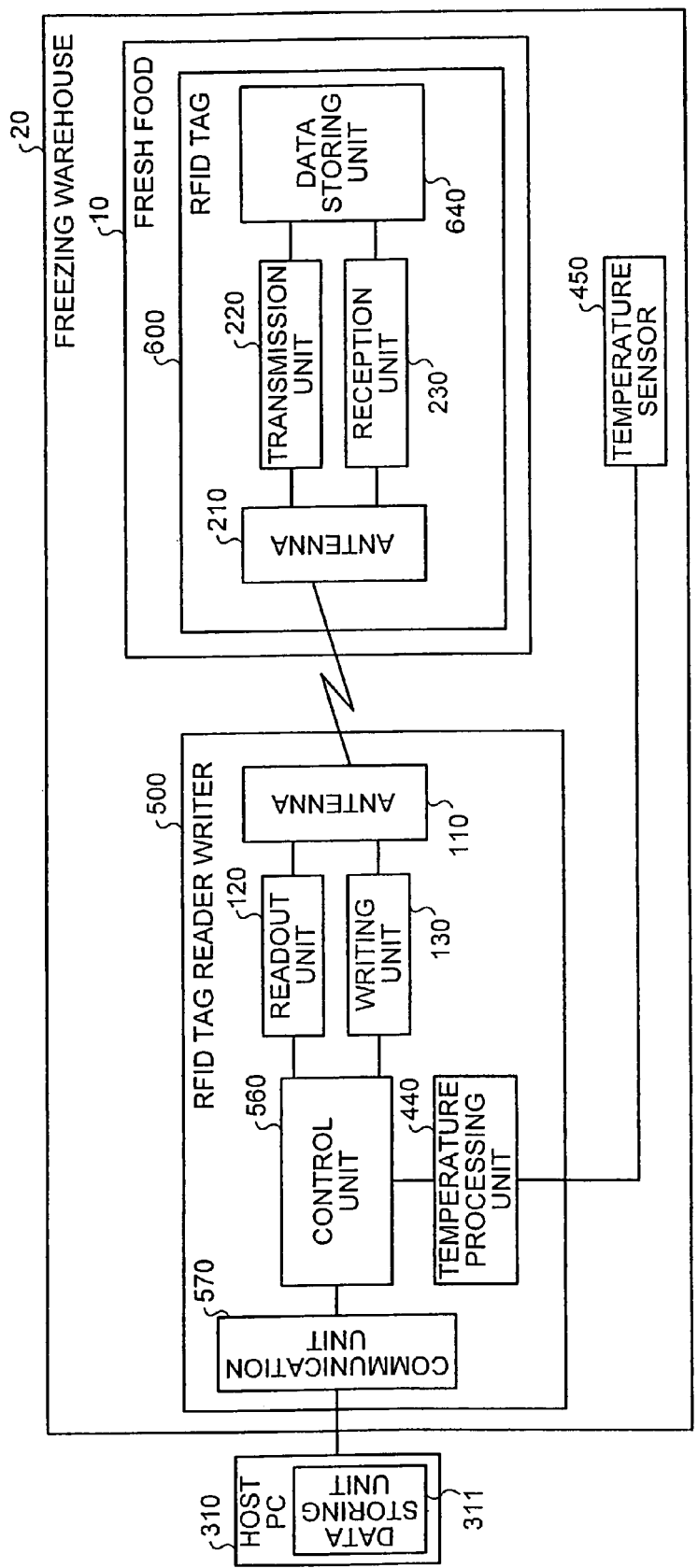
FIG. 6 is a functional block diagram of a system structure of a temperature monitoring system according to a fourth embodiment of the present invention.

FIG. 6 is a functional block diagram of a system structure of the temperature monitoring system according to the fourth embodiment. Note that, here, for convenience of explanation, functional units carrying out the same roles as the respective units shown in FIG. 5 will be denoted by the identical reference numerals, and a detailed explanation of the functional units will be omitted. As shown in FIG. 6, this temperature monitoring system includes the RFID tag reader writer 500, an RFID tag 600, and a host PC 310.

The host PC 310 is a computer that receives temperature measured by the RFID tag reader writer 500 and instructs the RFID tag reader writer 500 to write the temperature in an RFID tag. However, unlike the host PC 300, the host PC 310 includes a data storing unit 311.

The data storing unit 311 is for storing temperature measured by the RFID tag reader writer 500. The data storing unit 311 stores temperature of the fresh food 10 using the same data structure as the data storing unit 240 shown in FIG. 2.

On the other hand, a data storing unit 640 of the RFID tag 600 does not store temperature information unlike the data storing unit 240.

As described above, in the fourth embodiment, temperature information is managed using the host PC 310 instead of an RFID tag. This makes it possible to manage more information on the fresh food in addition to temperature information during storage of the fresh food in the freezing warehouse 20. For example, a global positioning system ("GPS") sensor is connected to an RFID tag reader writer to manage information on the GPS sensor in the host PC 310, whereby it is possible to manage a moving place and temperature of fresh food in association with each other.

In the first to the fourth embodiments, the temperature monitoring system using one RFID tag reader writer is explained. However, for example, when a freezing warehouse is large, plural RFID tag reader writers may be used. Thus, in a fifth embodiment of the present invention, a temperature monitoring system using two RFID tag reader writers will be explained.

Figure 7:
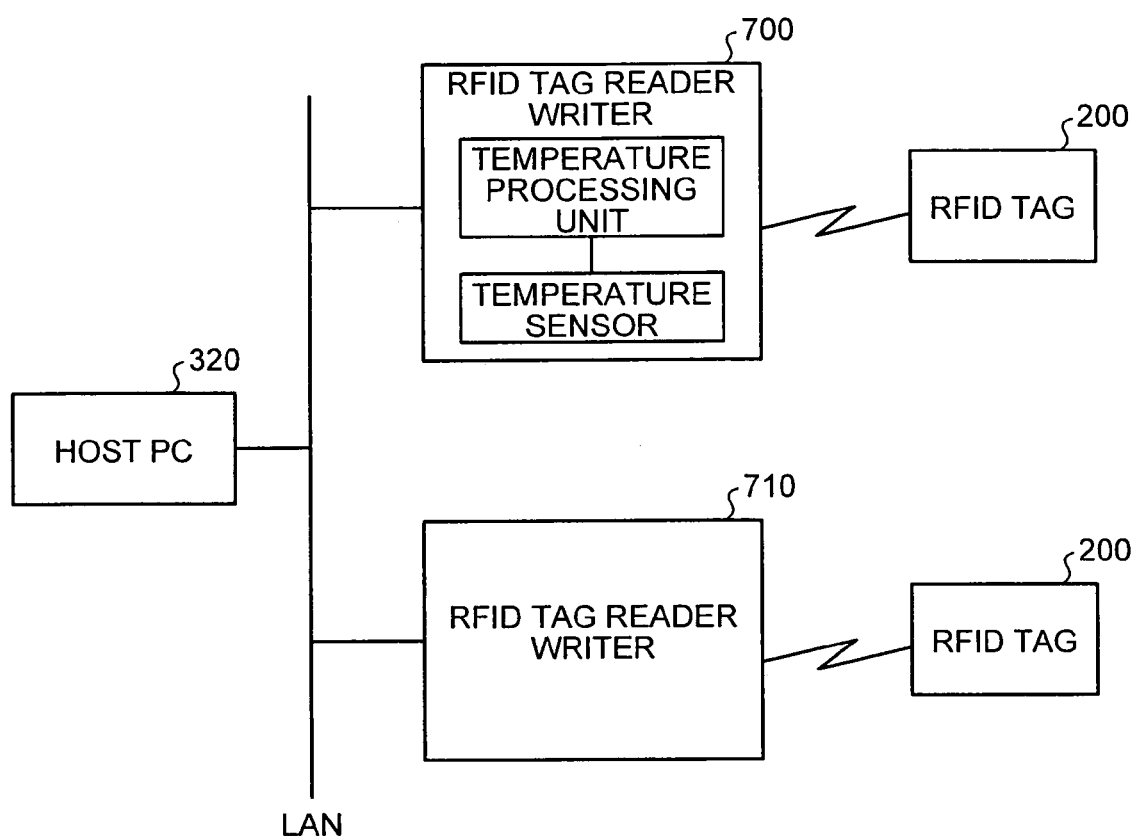
FIG. 7 is a functional block diagram of a system structure of a temperature monitoring system according to a fifth embodiment of the present invention.

FIG. 7 is a functional block diagram of a system structure of the temperature monitoring system according to the fifth embodiment. As shown in the figure, this temperature monitoring system is constituted by connecting two RFID tag reader writers 700 and 710 and a host PC 320 via a LAN. Here, the RFID tag reader writer 700 has a temperature sensor incorporated therein, and the RFID tag reader writer 710 does not have a temperature sensor incorporated therein.

The RFID tag reader writer 700 transfers measured temperature to the host PC 320. The host PC 320 instructs the RFID tag reader writer 700 to write the temperature received from the RFID tag reader writer 700 in the RFID tag 200 managed by the RFID tag reader writer 700 and also instructs the RFID tag reader writer 710 to write the temperature in the RFID tag 200 managed by the RFID tag reader writer 710.

As described above, in the fifth embodiment, the RFID tag reader writer 700 having the temperature sensor incorporated therein transfers measured temperature to the host PC 320, and the host PC 320 instructs the RFID tag reader writers 700 and 710 to write the temperature in the RFID tag 200. This makes it possible to perform temperature monitoring for a large number of items of fresh food stored in a large freezing warehouse using one RFID tag reader writer having a temperature sensor incorporated therein.

Note that, here, since the host PC 320 instructs the RFID tag reader writers 700 and 710 to write temperature in the RFID tag 200, it is possible to process temperature information in the host PC 320 and write the temperature information in the RFID 200. In addition, when only temperature information is written in the RFID tag 200, the RFID tag reader writer 700 can also transmit the temperature information directly to the RFID tag reader writer 710 without the intervention of the host PC 320.

In the fifth embodiment, the case in which one RFID tag reader writer has a temperature sensor incorporated therein is explained. However, it is also possible to establish a temperature monitoring system by combining an RFID tag reader writer having a temperature sensor with high accuracy incorporated therein and an RFID tag reader writer having a temperature sensor with lower accuracy incorporated therein. Thus, in a sixth embodiment of the present invention, a temperature monitoring system, in which an RFID tag reader writer having a temperature sensor with high accuracy incorporated therein and an RFID tag reader writer having a temperature sensor with lower accuracy incorporated therein are combined, will be explained.

Figure 8:
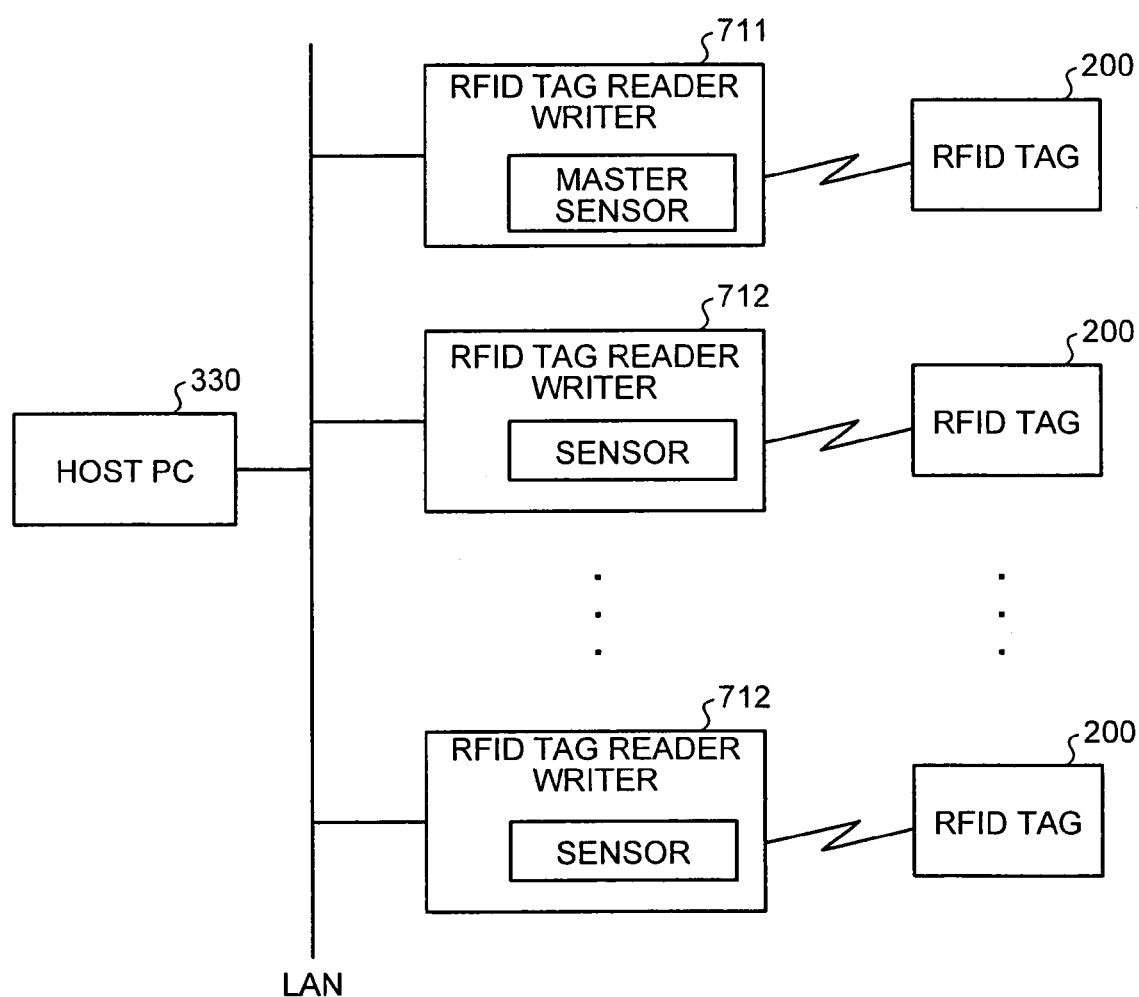
FIG. 8 is a functional block diagram of a system structure of a temperature monitoring system according to a sixth embodiment of the present invention.

FIG. 8 is a block diagram of a system structure of the temperature monitoring system according to the sixth embodiment. As shown in the figure, this temperature monitoring system is constituted by connecting an RFID tag reader writer 711, which has a temperature sensor with high accuracy incorporated therein as a master sensor, and plural RFID tag reader writers 712, which have temperature sensors with lower accuracy incorporated therein, via a LAN.

The RFID tag reader writers 712 receive a value measured by the master sensor from the host PC 330 at the time of system startup or the like and compare the measured value with values measured by the sensors incorporated therein to calculate a correction value. Then, the RFID tag reader writers 712 store the calculated correction value and correct the values measured by the sensors incorporated therein to record the values in the RFID tags 200.

As described above, in the sixth embodiment, a measured value of the temperature sensor with high accuracy is used to correct measured values of the other temperature sensors and record the corrected measured values in the RFID tag 200. This makes it possible to eliminate an influence due to fluctuation in accuracy and errors of temperature sensors and record temperature information with high accuracy in the RFID tags 200.

Note that, in the sixth embodiment, the temperature sensor with high accuracy is used as a master sensor. However, it is also possible to use sensors with the same accuracy as all the temperature sensors, transfer temperature measured by each RFID tag reader writer to a host PC, calculate an average of measured values of all the sensors in the host PC, and write the average in each RFID tag.

In addition, each RFID tag reader writer can compare the average calculated in the host PC and the measured value of each sensor to calculate a correction value and correct the measured value of each sensor with the correction value to write the corrected measured value in an RFID tag. In this way, it is possible to make it unnecessary to calculate an average in every measurement by using a correction value.

In the first to the sixth embodiment, the case in which temperature is measured at the fixed time interval and recorded together with measurement time is explained. However, it is also possible to store a threshold for temperature in an RFID tag and, only when temperature of the fresh food 10 exceeds the threshold, record the temperature in the RFID tag.

FIG. 9 is a diagram of an example of a temperature threshold that is stored by the RFID tag. The diagram indicates that the threshold is set to 25° C. and, when temperature rises to 26° C. or more, the temperature is written in the RFID tag as an alarm.

In other words, a threshold temperature is set in an RFID tag in advance as a threshold value (alarm judgment value) of a temperature sensor in an RFID tag reader writer (or set in a file of a host PC as a threshold associated with a tag address).

Then, when an operation starts, the RFID tag reader writer reads the threshold temperature from the RFID tag first (or every time comparison is performed) and compares the threshold temperature with a value of the sensor at every designated time. As a result of the comparison, when the value exceeds the threshold temperature, the RFID tag reader writer writes the result in the RFID tag.

In this way, when temperature exceeds the threshold temperature, the temperature is written in the RFID tag, whereby it is possible to confirm later whether fresh food has been kept in a predetermined temperature environment or has been out of the predetermined temperature environment using a record written in the RFID tag.

Note that a result of comparison with the threshold temperature may be notified to the host PC every time the comparison is performed, or the host PC may be caused to immediately recognize occurrence of abnormality in fresh food attached with the RFID tag. In addition, the threshold temperature stored in the RFID tag may be stored on the sensor side.

In some cases, it is necessary to set temperature thresholds not only on a high temperature side but also on a low temperature side. FIG. 10 is a diagram of an example in which an RFID tag stores two temperature thresholds. The figure indicates a case in which −5° C. is set as a threshold temperature on the low temperature side.

In addition, it is also possible to set the same value or different values for plural and different kinds of sensors as threshold values. For example, since ranges of temperature that measuring objects can withstand are different, it is likely that temperature desired to be monitored varies or it is likely that monitored temperature varies due to a difference of a packing state (inside and outside of a box). Therefore, when the measuring objects are stored in one room, naturally, it is necessary to set different values for the sensors.

In order to realize this, plural thresholds are stored in each RFID tag (or in a file of a host PC as thresholds associated with tag addresses), and this setting is performed in advance for each monitoring object.

Then, when an operation starts, the RFID tag reader writer reads the threshold from the RFID tag first (or every time comparison is performed) and compares the threshold with a value of the corresponding sensor at every designated time. As a result of the comparison, when the value exceeds the threshold, the RFID tag reader writer writes the result in the RFID tag.

It is needless to mention that the threshold (defined temperature) stored in the RFID tag may be stored on the sensor side, the RFID tag reader writer side, or the host PC side as long as the threshold is common to the respective RFID tags (monitoring objects).

In addition to the threshold, it is also possible to set a check condition for comparing a measured value with the threshold to check the measured value. For example, a check condition for checking measured values in Wednesday every week or checking measured values from 9 a.m. to 8 p.m. every day can be set.

Although only the temperature sensor is explained in this embodiment, when monitoring is performed by sensors including other sensors (e.g., a humidity sensor), monitoring can be performed under both the conditions. In addition, if a monitoring object flag is provided in an RFID tag, it is possible to designate a monitoring sensor that should be required on each monitoring object side among different kinds of plural sensors. In this way, it is also possible to designate different kinds of plural sensor conditions and monitor fresh food.

Incidentally, it may be desired to raise processing priorities for part of plural managing objects attached with RFID tags. For example, when plural kinds of food having different freshness dates are monitored collectively depending on temperature, there is a case in which it is desired to process the kinds having different freshness dates as separate groups (change of the freshness dates, management of shipment dates, etc.) from a point when the temperature reaches certain temperature.

In such a case, if tag addresses of all the RFID tags can be managed in advance, there is a method of creating association of the tag addresses with the groups for each freshness date in advance, designating respective addresses, and processing the managing objects. However, when food is distributed through plural warehouses and process lines from producing districts, all tag addresses cannot be managed in advance in many cases.

When tag addresses of all products cannot be managed in advance in this way, since processing for each RFID tag is performed while presence of all RFID tags is recognized using an all-UID recognition command (anti-collision command), there is a disadvantage that processing priorities for part of the RFID tags cannot be raised.

As a measure for avoiding this disadvantage, there is also a method of reading tag addresses of all RFID tags, preparing a correspondence table of the respective addresses and product life-cycles in the outside, and performing priority processing with the respective tag addresses designated in a pre-stage process. However, there is a problem in that, for example, prior address reading work is required.

To avoid this problem, in a seventh embodiment of the present invention, processing priorities for part of the managing objects are raised by the following two methods.

(1) Method of realization through address grouping
(2) Method of processing through threshold setting and dedicated commands Both the methods will be hereinafter explained.
(1) Method of Realization Through Address Grouping This method uses group select commands to thereby group plural kinds of food having different freshness dates depending on temperature and execute different kinds of processing for the food. More specifically, it is assumed that the plural kinds of food are grouped as indicated below, and processing for the respective groups is performed.

Group A: When temperature reaches 25° C., it is necessary to reduce a freshness date by three days Group B: When temperature reaches 30° C., it is necessary to reduce a freshness date by three days (general products)

In this example, when temperature in a warehouse under temperature control rises to, for example, 25° C., only freshness dates of products in the group A are reduced by three days to perform shipment management after that. Specific addressing and the like will be hereinafter explained.

Example of Setting for Group Addresses

Sub-addresses corresponding to the groups A and B are allocated to user areas in RFID tags. These sub-addresses have an object of facilitating groping of the respective RFID tags. This is because, although UID addresses of 64 bits may be used without change usually, since corresponding relations of the UIDs and the groups A and B are not consistent usually, it is difficult to distinguish grouping to be described later according to a bit if the UIDs are used without change.

As identification for setting a group address to a group level with a high processing priority (group A in this example), a bit 4 of an address prepared in a user area is defined as a group identification bit. A group address is set as shown in FIG. 11 with an address bit 4 set to "1" with respect to an RFID tag of the group A requiring a high processing level.

Figures 11, 12:
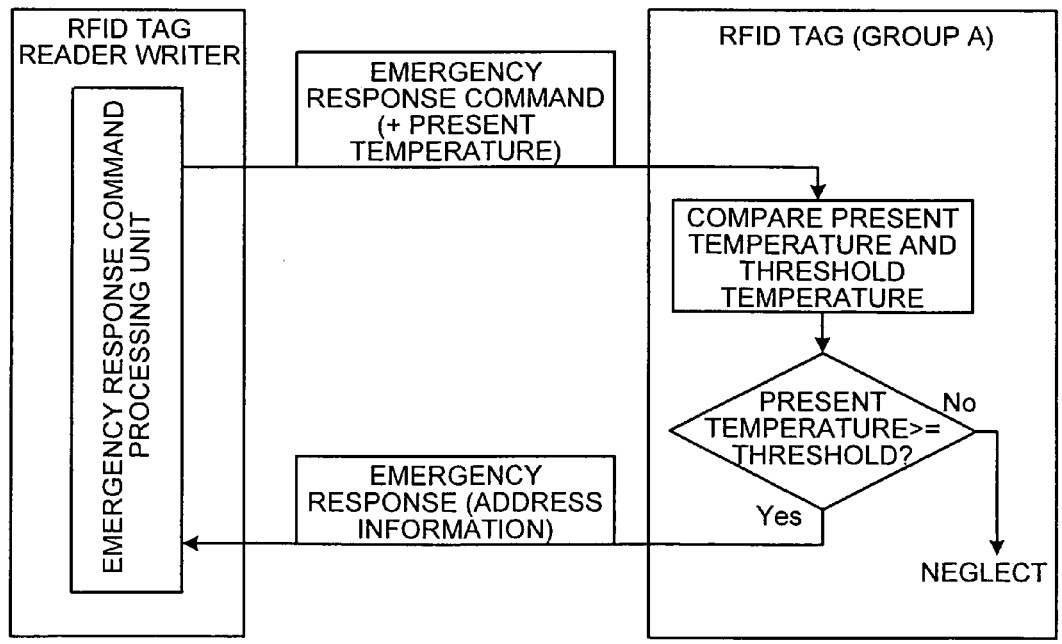
FIG. 11 is a diagram of an example of setting of group addresses.
FIG. 12 is a flow diagram of a flow of emergency response command processing.

Then, as shown in FIG. 11, in a state in which a sub-address for each group is set as shown in FIG. 11, when temperature rises to 25° C. outside the defined temperature, filter information with the bit 4 set to "1" is added to issue a group select command.

Consequently, only the group A with the sub-address bit 4 set to "1" comes into a selected state (ID state) to be capable of responding to commands after that. Since the group B is in a Ready state (sleep state), the group B does not respond to commands.

In this state, processing with respect to the group A is made possible, and reading or writing with respect to individual RFID tags in the group A or writing with respect to all the RFID tags (multi-write) is made possible. Thus, it is possible to change freshness date information and priorities for shipment processing concerning the respective RFID tags (products).

When this processing ends, it is also possible to return the group A to the same state as the group B with an unselect command. Tag groups are limited to a fixed range temporarily to process the tag groups in this way, whereby it is possible to improve processing efficiency.

(2) Method of Processing Through Threshold Setting and Dedicated Commands

Temperature thresholds, at which an alarm should be given, are set for each tag group with respect to the respective RFID tags (products).

EXAMPLE

Group A: When temperature reaches 25° C., it is necessary to reduce a freshness date by three days→Threshold 25° C.

Group B: When temperature reaches 30° C., it is necessary to reduce a freshness date by three days→Threshold 30° C.

Then, as shown in FIG. 12, an RFID tag reader writer side prepares an emergency response command (Read-em) as a dedicated command with respect to an RFID tag and issues a main command added with present temperature information to the RFID tag side at a fixed interval.

When the main command is received on the RFID tag side, the RFID tag side compares present temperature information added to the main command and a temperature threshold set in advance and returns a response (including a tag address of the RFID tag) only when the present temperature information exceeds the temperature threshold. Consequently, since only tags recognizing the response as a temperature alarm respond, it is possible to perform processing in shorter time than recognizing and confirming all tags individually.

As described above, in the seventh embodiment, since it is made possible to process only part of RFID tags using a group address or a dedicated command, the part of RFID tags can be processed preferentially.

In the first to the seventh embodiments, the temperature monitoring system for fresh food is explained. However, it is also possible to establish other applied systems by incorporating other sensors in or connecting other sensors to an RFID tag reader writer. Thus, in an eighth embodiment of the present invention, an on-vehicle vibration monitoring system, which uses an RFID tag reader writer to which a GPS sensor and a vibration sensor are connected, will be explained.

Figure 13:
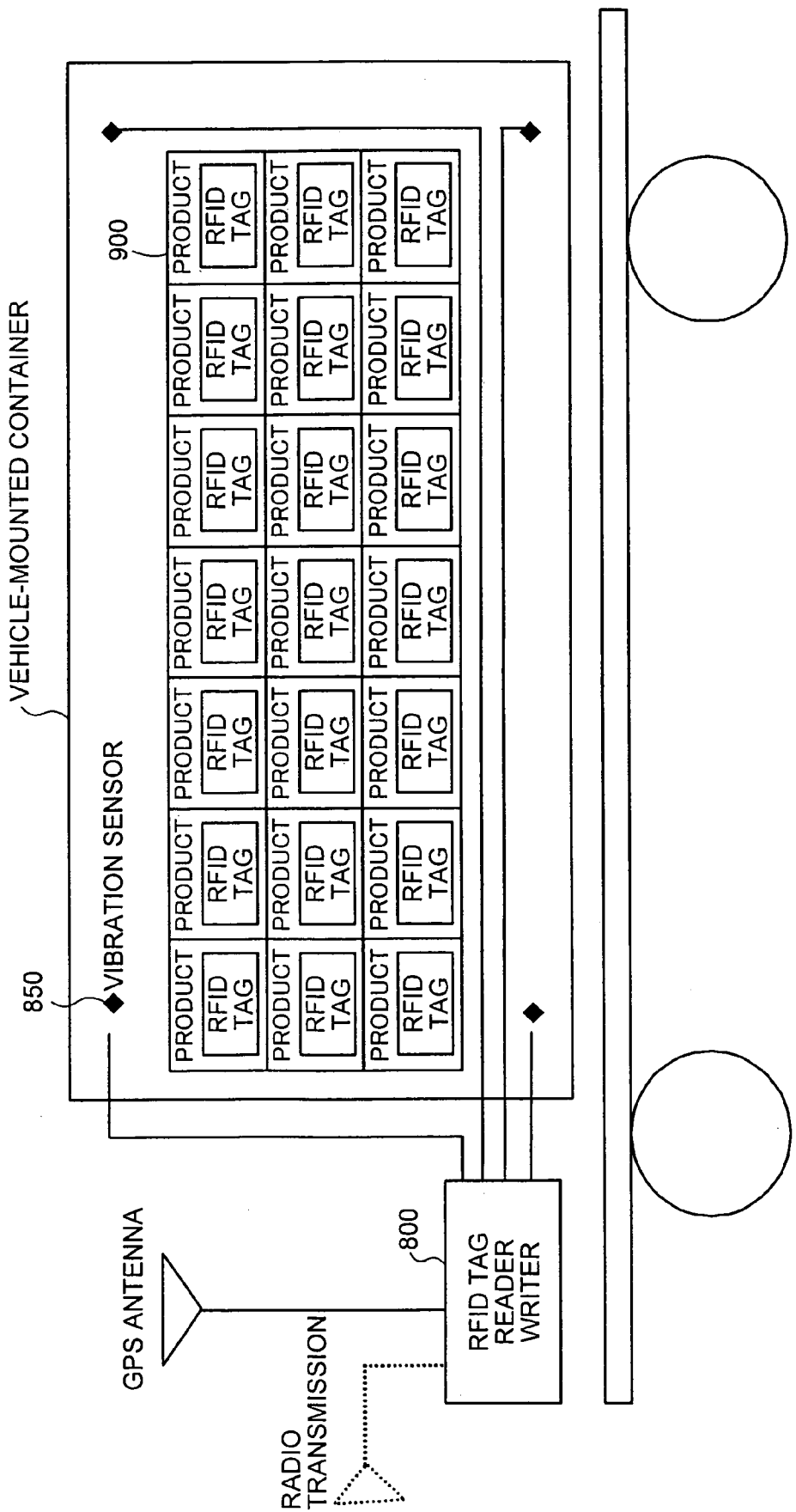
FIG. 13 is an explanatory diagram for explaining an on-vehicle vibration monitoring system according to an eighth embodiment of the present invention.

First, the on-vehicle vibration monitoring system according to the eighth embodiment will be explained. FIG. 13 is an explanatory diagram for explaining the on-vehicle vibration monitoring system according to the eighth embodiment. This on-vehicle vibration monitoring system is a system that, when melons are transported from a place of origin (e.g., Yubari in Hokkaido) to a center (e.g., Tokyo), monitors vibration during the transportation.

High-grade melons lose a commercial value thereof when a quality of melon declines due to damage caused by vibration, shock, or the like or due to vibration of a fixed amount (fixed number of times) or more that is not so serious as to cause damage. Although the products (melons) are boxed and simply packed, vibration or shock of a fixed amount (strength and number of times) or more applied to the products makes guarantee by the simple packing doubtful.

Figure 14:
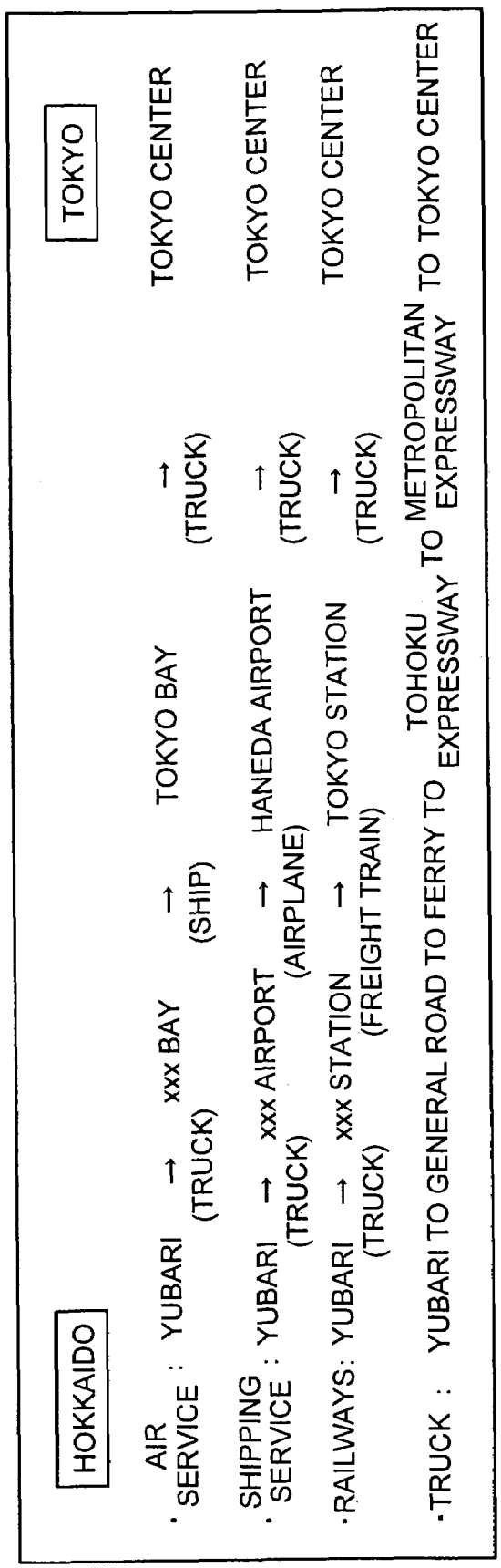
FIG. 14 is a diagram of examples of means of transportation and routes.

In addition, to deliver one product to a destination, as shown in FIG. 14, plural means of transportation are used, although there is only one route. In addition, since the product is transported via plural dealers, it is difficult to manage vibration applied to the product.

In the eighth embodiment, a case in which simply-packed products (melons) are loaded on a vehicle-mounted container in a large quantity and transported is assumed. It is assumed that the products are delivered to the destination through plural means shown in FIG. 14. In addition, as an example of quality control during transportation, it is assumed that product confirmation (confirmation of presence or absence of damage) for each product is required when vibration of 1 G or more is applied, and tasting confirmation is required when the number of times of vibration of 0.5 G or more exceeds 100 times.

As shown in FIG. 13, vibration sensors 850 are arranged in four places in the vehicle-mounted container to grasp vibration/shock information, and an RFID tag reader writer 800 including a sensor and a GPS monitoring function is arranged outside the vehicle-mounted container (or may be arranged inside the container excluding a GPS antenna).

Only one vibration sensor 850 may be arranged if the vibration sensor 850 is stable in the vehicle-mounted container. However, since there is slight fluctuation depending on a position, the vibration sensors 850 are arranged in the four places, and an average of the four vibration sensors 850 is adopted as a vibration amount.

In addition, an RFID tag 900 is attached to each product by a unit of box in which plural melons are packed collectively (e.g., in sixteens).

Figure 15:
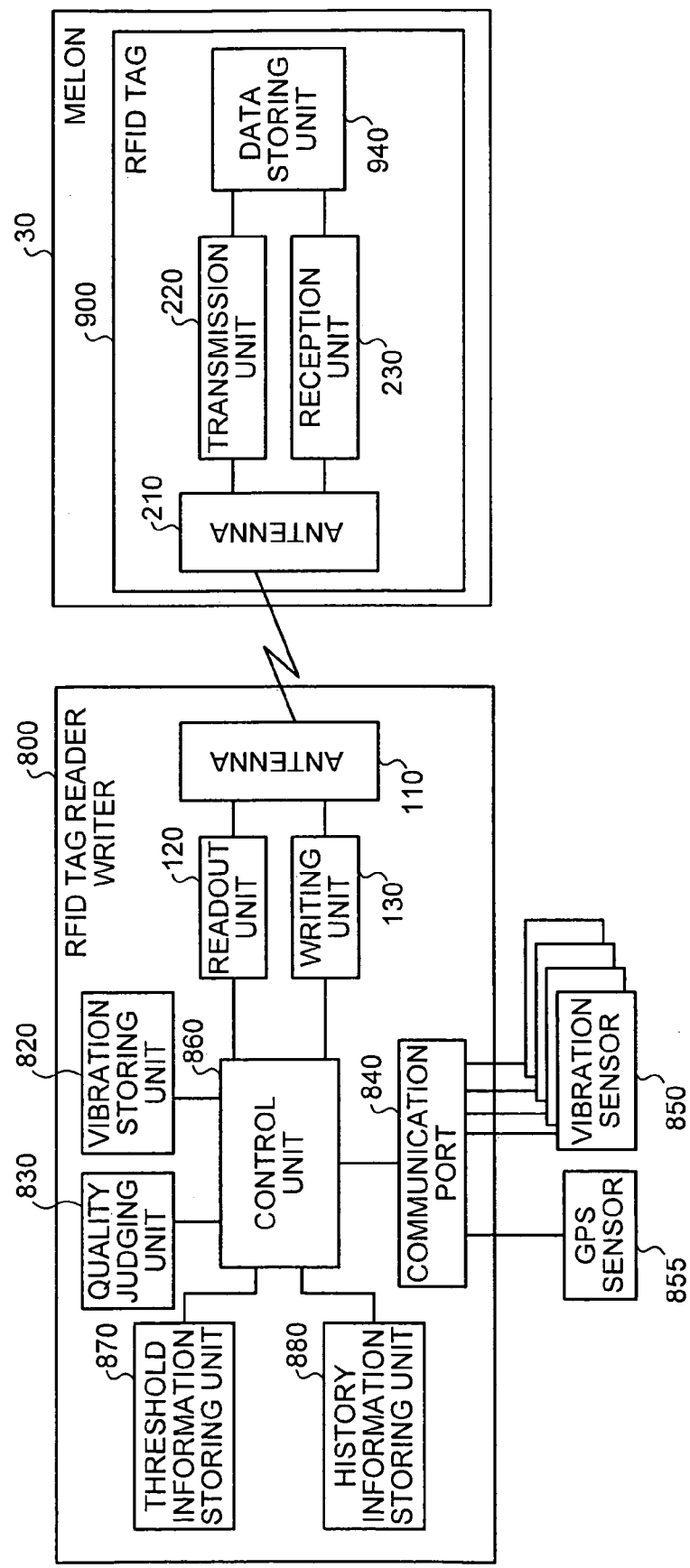
FIG. 15 is a functional block diagram of a system structure of the on-vehicle vibration monitoring system according to the eighth embodiment.

Next, a system structure of the on-vehicle vibration monitoring system according to the eighth embodiment will be explained. FIG. 15 is a functional block diagram of a structure of the on-vehicle vibration monitoring system according to the eighth embodiment. Note that, here, for convenience of explanation, functional units carrying out the same roles as the respective units shown in FIG. 1 will be denoted by the identical reference numerals, and a detailed explanation of the functional units will be omitted.

As shown in FIG. 15, this on-vehicle vibration monitoring system includes an RFID tag reader writer 800 and an RFID tag 900 attached to a melon 30 and monitors a vibration amount of the melon 30 transported by a vehicle-mounted container. Note that, here, for convenience of explanation, only one melon 30 and only one RFID tag 900 are shown, this vibration monitoring system monitors vibration amounts of melons in plural boxes attached with RFID tags.

The RFID tag reader writer 800 includes the antenna 110, the readout unit 120, the writing unit 130, a vibration storing unit 820, a quality judging unit 830, a communication port 840, a control unit 860, a threshold information storing unit 870, and a history information storing unit 880.

The vibration storing unit 820 records information on the vibration in the history information storing unit 880 and the RFID tag 900 if vibration equal to or larger than a threshold occurs while the melon 30 is transported.

The quality judging unit 830 is a processing unit that, when the transportation of the melon 30 ends, reads out the vibration information recorded in the RFID 900 and judges a quality of the melon 30 based on the read-out vibration information.

The communication port 840 is an interface for making connection with various sensors to input measured values. Here, positional information is inputted from the GPS sensor 855 and vibration amounts are inputted from the four vibration sensors 850.

The control unit 860 is a processing unit that controls the entire RFID tag reader writer 800. More specifically, the control unit 860 performs exchange and the like of data among the respective functional units to thereby cause the RFID tag reader writer 800 to function as one apparatus.

The threshold information storing unit 870 is a storing unit that stores a threshold of processing with respect to vibration amounts inputted from the vibration sensor 850. FIG. 16 is a diagram of an example of threshold information stored by the threshold information storing unit 870.

As shown in the figure, the threshold information stored by this threshold information storing unit 870 includes a vibration detection level, a tag recording threshold, a minimum level unit, a maximum number of times of tag writing, and the number of vibration sensors.

Here, the vibration detection level is a vibration amount of a minimum level that the RFID tag reader writer 800 should process, the tag recording threshold is a vibration amount of a minimum level that the RFID tag reader writer 800 should record in the RFID tag 900, and the minimum level unit is a level unit (width) of a vibration amount that should be recorded on the RFID tag 900 side.

The maximum number of times of tag writing is a maximum value that can be counted on the RFID tag 900 side, and the number of vibration sensors is the number of sensors arranged in the vehicle-mounted container. Here, the number of vibration sensors is four. As a vibration amount, an average of information from the four sensors is calculated, whereby an influence of partial vibration is eliminated.

The history information storing unit 880 is a storing unit that, when vibration equal to or larger than the threshold stored in the threshold information storing unit 870 occurs, stores information on the vibration. FIG. 17 is a diagram of an example of history information stored by the history information storing unit 880.

As shown in the figure, the history information stored by this history information storing unit 880 includes occurrence time indicating time when vibration equal to or larger than the vibration detection level occurs, positional information indicating a position where the vibration occurs, a vibration level of the vibration, and user information in which arbitrary information like a route name and a product name can be written.

Figures 18, 19:
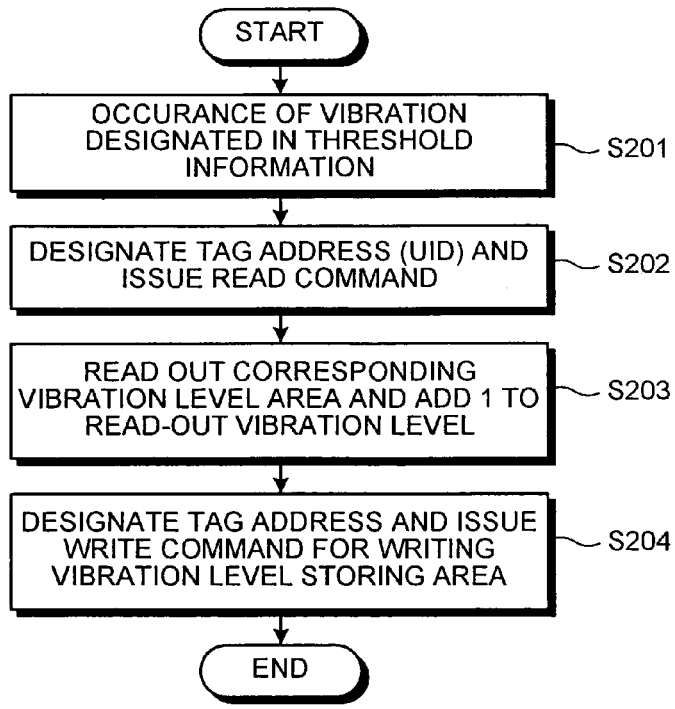
FIG. 18 is a diagram of an example of vibration information stored by a data storing unit.
FIG. 19 is a flowchart of a processing procedure of processing for recording vibration information in an RFID tag by a vibration recording unit.

The RFID tag 900 is a radio IC tag that stores information on vibration of the melon 30 in the data storing unit 940. FIG. 18 is a diagram of an example of vibration information stored by the data storing unit 940. As shown in the figure, numbers of times of occurrence are stored in this data storing unit 940 with respect to four vibration levels.

Next, a processing procedure of processing for recording vibration information in the RFID tag 900 by the vibration storing unit 820 will be explained. FIG. 19 is a flowchart of the processing procedure of the processing for recording vibration information in the RFID tag 900 by the vibration storing unit 820. Note that, here, it is assumed that a tag address of the RFID tag 900 is known in advance.

As shown in the figure, this vibration storing unit 820 inputs measured values of the four vibration sensors from the communication port 840 and calculates an average.

Then, when vibration designated in threshold information occurs (step S201), the vibration storing unit 820 designates a tag address and issues a Read command using the readout unit 120 (step S202), and reads out the number of times of occurrence of a vibration level corresponding to the vibration.

Then, the vibration storing unit 820 adds "1" to the read-out number of times of occurrence (step S203), issues a Write command using the writing unit 130, and writes the updated number of times of occurrence in the RFID tag 900 (step S204).

In this way, when vibration designated in the threshold information occurs, this vibration storing unit 820 can record a vibration occurrence state during transportation by updating the number of times of occurrence stored in the RFID 900 by "1".

Figure 20:
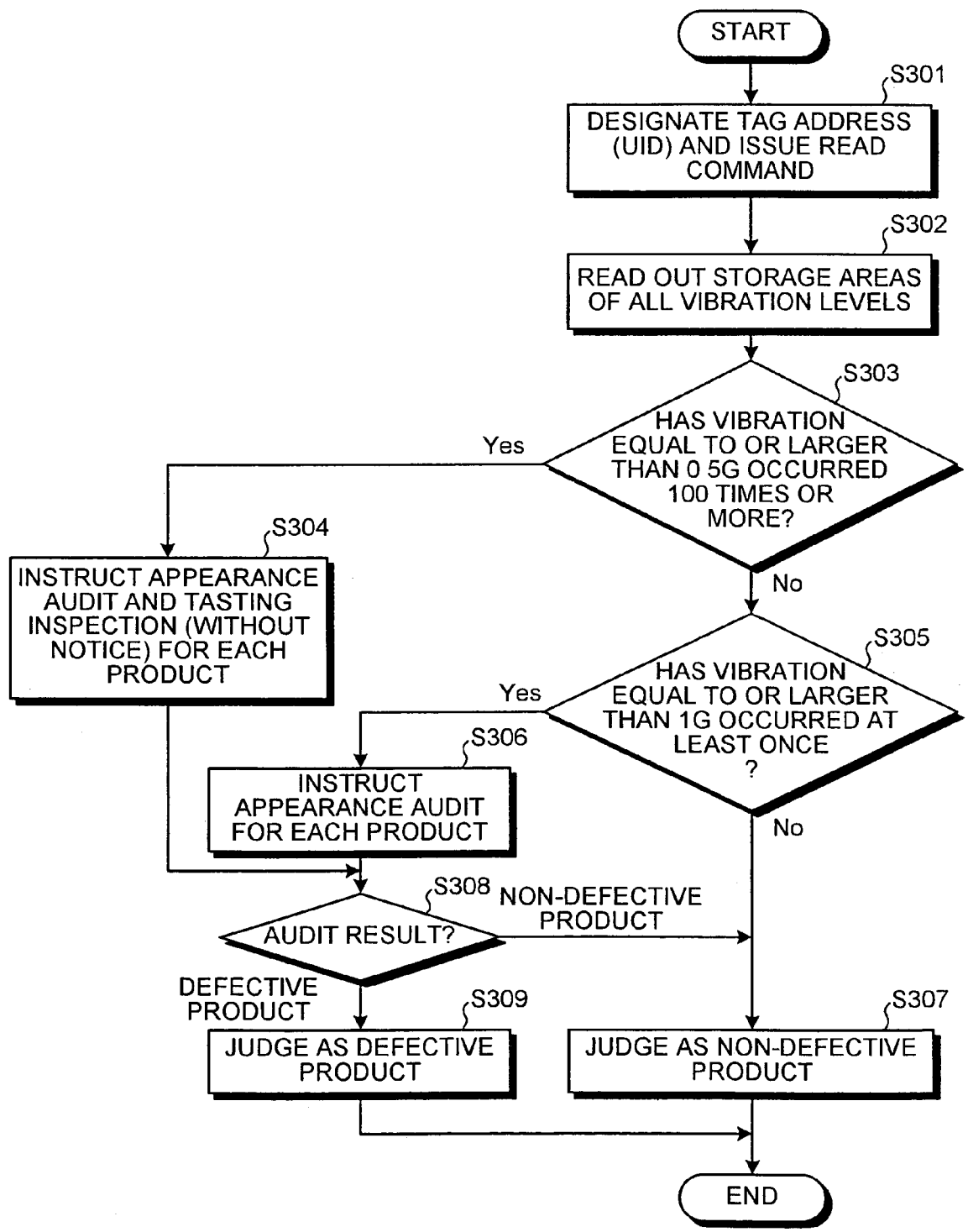
FIG. 20 is a flowchart of a processing procedure of quality judgment processing by a quality judging unit.

Next, a processing procedure of quality judgment processing by the quality judging unit 830 will be explained. FIG. 20 is a flowchart of the processing procedure of the quality judgment processing by the quality judging unit 830. Note that this quality judgment processing is performed when the melon 30 arrives at a destination.

As shown in the figure, this quality judging unit 830 issues a Read command using the readout unit 120 designating a tag address (step S301) and reads out storage areas (numbers of times of occurrence) of all the vibration levels from the RFID tag 900 (step S302).

Then, the quality judging unit 830 judges whether vibration equal to or larger than 0.5 G has occurred one-hundred times or more based on the read-out number of times (step S303). If the vibration equal to or larger than 0.5 G has occurred one-hundred times or more, the quality judging unit 830 instructs an inspector to perform appearance audit and tasting inspection with respect the melon 30 attached with the RFID tag 900 (step S304).

On the other hand, if the vibration equal to or larger than 0.5 G has not occurred one-hundred times or more, the quality judging unit 830 judges whether vibration equal to or larger than 1 G has occurred at least once (step S305). If the vibration equal to or larger than 1 G has occurred at least once, the quality judging unit 830 instructs the inspector to perform appearance audit with respect to the melon 30 attached with the RFID tag 900 (step S306). If the vibration equal to or larger than 1 G has not occurred at least once, the quality judging unit 830 judges that the melon 30 attached with the RFID tag 900 is a non-defective product (step S307).

When the quality judging unit 830 has instructed the appearance audit or the tasting inspection, the quality judging unit 830 causes the inspector to input an audit result to judge whether the melon 30 is a non-defective product (step S308). If the audit result indicates a non-defective product, the quality judging unit 830 judges that all the melons 30 attached with the RFID tag 900 are non-defective products (step S307). If the audit result indicates a defective product, the quality judging unit 830 judges that all the melons 30 attached with the RFID tag 900 are defective products (step S309).

In this way, this quality judging unit 830 reads out numbers of times of occurrence of all the vibration levels from the RFID tag 900 and judges a quality of the melon 30 based on the numbers of times of occurrence, whereby it is possible to perform sure quality confirmation.

In addition, detailed information on transportation channels according to the GPS sensor 855 and vibration information are recorded in association with each other with respect to all the transportation channels. This makes it also possible to judge a quality for each of the transportation channels. For example, when a truck service is used, it is possible to manage time of loading on and unloading from the truck, a general road and an expressway, and statistic information for each carrier and to take a quality measure for the next time accurately.

As described above, in the eighth embodiment, the vibration storing unit 820 records information on vibration, which occurs during transportation, in the RFID tag 900, and the quality judging unit 830 judges a quality of the melon 30 based on the vibration information recorded in the RFID tag 900. This makes it possible to manage the quality of the melon 30 surely.

In the first to the eighth embodiments, the cases in which the temperature sensor, the GPS sensor, and the vibration sensor are used as sensors are explained. However, the present invention is not limited to this case and can also be applied to, for example, cases in which other sensors like a humidity sensor, an acceleration sensor, a shock sensor, a water quality sensor, and an ion sensor are used.

In addition, in the first to the eighth embodiments, the case in which the RFID tag is used is explained. However, the present invention is not limited to this case and can also be applied to, for example, cases in which other media having a storing property like an IC card and a memory card are used.

According to the present invention, since data concerning an environment, in which a product attached with a radio IC tag is placed, is collected on a real time basis, there is an effect that it is possible to manage the product surely based on the collected data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio IC tag reader writer that reads out data from a radio IC tag and writes data in the radio IC tag using radio, comprising:
    a receiving unit that receives from a sensor a value of a parameter measured by the sensor;
    a writing unit that writes the value in the radio IC tag; and
    a judging unit that judges whether the value received by the receiving unit exceeds a predetermined threshold,
    wherein the writing unit writes the value in the radio IC tag if the judging unit judges that the value exceeds the predetermined threshold, the predetermined threshold is stored in the radio IC tag, the judging unit reads the predetermined threshold from the radio IC tag, a threshold check condition is stored in the radio IC tag, and the judging unit reads the threshold check condition and, based on the threshold check condition, judges whether the value exceeds the predetermined threshold.

2. The radio IC tag reader writer according to claim 1, wherein the sensor is incorporated in the radio IC tag reader writer.

3. The radio IC tag reader writer according to claim 1, wherein
    the receiving unit receives the value for a plurality of times at a predetermined first time interval, and
    the writing unit writes the value in the radio IC tag for a plurality of times at a predetermined second time interval.

4. The radio IC tag reader writer according to claim 1, wherein the receiving unit receives time of measurement of the parameter measured by the sensor, and
    the writing unit writes the time and the value in the radio IC tag in a corresponding manner.

5. The radio IC tag reader writer according to claim 1, wherein the threshold check condition relates to time.

6. The radio IC tag reader writer according to claim 1, further comprising a transmitting unit that transmits the value received by the receiving unit to a computer, wherein
    the writing unit writes the value in the radio IC tag based on an instruction from the computer.

7. The radio IC tag reader writer according to claim 1, wherein the sensor is a temperature sensor.

8. The radio IC tag reader writer according to claim 1, wherein the sensor is a GPS sensor and a vibration sensor.

9. A radio IC tag system constituted by connecting at least one first radio IC tag reader writer with a plurality of second radio IC tag reader writers via a network, each of the first radio IC tag reader writer and the second radio IC tag reader writers having a corresponding radio IC tag, wherein
    the first radio IC tag reader writer includes
        a first receiving unit that receives from a sensor a value of a parameter measured by a sensor;
        a first writing unit that writes the value in the corresponding radio IC tag; and
        a transmitting unit that transmits the value received by the first receiving unit to the second radio IC tag reader writers via the network; and
    each of the second radio IC tag reader writers includes
        a second receiving unit that receives the value transmitted by the transmitting unit; and
        a second writing unit that writes the value received by the second receiving unit in the corresponding radio IC tag.

10. The radio IC tag system according to claim 9, wherein
    the transmitting unit transmits the value received by the first receiving unit to a computer connected to the network, and
    the second receiving unit receives the value from the computer.

11. A radio IC tag system constituted by connecting at least one first radio IC tag reader writer with a plurality of second radio IC tag reader writers via a network, each of the first radio IC tag reader writer and the second radio IC tag reader writers having a corresponding radio IC tag, wherein
    each of the first radio IC tag reader writer and the second radio IC tag reader writers includes
        a receiving unit that receives from a corresponding sensor a value of a parameter measured by the corresponding sensor; and
        a writing unit that writes the value in the corresponding radio IC tag, wherein
    the sensor corresponding to the first radio IC tag reader writer has [relatively] higher sensitivity than the sensors corresponding to the second radio IC tag reader writers,
    the first radio IC tag reader writer transmits the value to the second radio IC tag reader writers, and
    the second radio IC tag reader writers calibrate the value they possess based on the value received from the first radio IC tag reader writer, and write the value after calibration in the corresponding radio IC tag.

12. A radio IC tag system that includes a plurality of radio IC tag reader writers connected to a computer via a network, each of the radio IC tag reader writers having a corresponding radio IC tag, wherein each of the radio IC tag reader writers includes
- a first receiving unit that receives from a sensor a value of a parameter measured by the sensor;
- a transmitting unit that transmits the value received by the first receiving unit to the computer via the network;
- a second receiving unit that receives from the computer an average of values received by the computer from other radio IC tag reader writers; and
- a writing unit that writes the average in the corresponding radio IC tag.

13. The radio IC tag system according to claim 12, further comprising a correcting unit that corrects the value received by the first receiving unit using the average received by the second receiving unit, wherein
the writing unit writes in the corresponding radio IC tag the value corrected by the correcting unit.

14. A method of writing data in a radio IC tag, comprising:
receiving a value of a parameter measured by a sensor;
reading a predetermined threshold stored in the radio IC tag;
reading a threshold check condition stored in the radio IC tag;
judging whether the value exceeds the predetermined threshold based on the threshold check condition; and
writing the value in the radio IC tag, if the judging unit judges that the value exceeds the predetermined threshold.

15. A temperature monitoring system that monitors temperature of a commodity, comprising:
a radio IC tag reader writer, a radio IC tag attached to the commodity, and a temperature sensor that measures a temperature of the commodity or around the commodity, wherein the radio IC tag reader writer includes
- a receiving unit that receives from the temperature sensor a value that represents the temperature of the commodity;
- a writing unit that writes the value in the radio IC tag; and
- a judging unit that judges whether the value received by the receiving unit exceeds a predetermined threshold,
wherein the writing unit writes the value in the radio IC tag if the judging unit judges that the value exceeds the predetermined threshold, the predetermined threshold is stored in the radio IC tag, the judging unit reads the predetermined threshold from the radio IC tag, a threshold check condition is stored in the radio IC tag, and the judging unit reads the threshold check condition and, based on the threshold check condition, judges whether the value exceeds the predetermined threshold.

16. A vibration monitoring system that monitors vibrations of a commodity while the commodity is being transported, comprising:
a radio IC tag reader writer, a radio IC tag attached to the commodity that stores vibration information, and a vibration sensor that measures vibrations of the commodity or around the commodity, wherein the radio IC tag reader writer includes
- a receiving unit that receives from the vibration sensor a value that represents vibrations measured by the vibration sensor;
- a judging unit that judges whether the value received by the receiving unit exceeds a predetermined threshold;
- a writing unit that writes the value as the vibration information in the radio IC tag, if the judging unit judges that the value exceeds the predetermined threshold;
- a readout unit that reads out the vibration information from the IC tag; and
- a quality judging unit that judges a quality of the commodity based on the vibration information.

17. The vibration monitoring system according to claim 16, wherein the quality judging unit instructs an inspection of the commodity when a number of occurrence of the vibrations recorded in the IC tag is equal to or larger than a predetermined number.

18. The radio IC tag reader writer according to claim 3, wherein the predetermined second time interval is the predetermined first time interval.

19. The radio IC tag reader writer according to claim 6, wherein the computer is connected to the IC tag reader writer via a network.

* * * * *

UNITED STATES PATENT AND TRADEMARK OFFICE
CERTIFICATE OF CORRECTION

PATENT NO. : 7,301,439 B2  Page 1 of 1
APPLICATION NO. : 10/986134
DATED : November 27, 2007
INVENTOR(S) : Shigeru Hashimoto et al.

It is certified that error appears in the above-identified patent and that said Letters Patent is hereby corrected as shown below:

Column 16, line 55, after "has", delete "[relatively]"

Signed and Sealed this

Thirteenth Day of May, 2008

JON W. DUDAS
*Director of the United States Patent and Trademark Office*